J. MILLER.
TROLLEY HARP.
APPLICATION FILED JULY 23, 1919.
1,340,456.
Patented May 18, 1920.
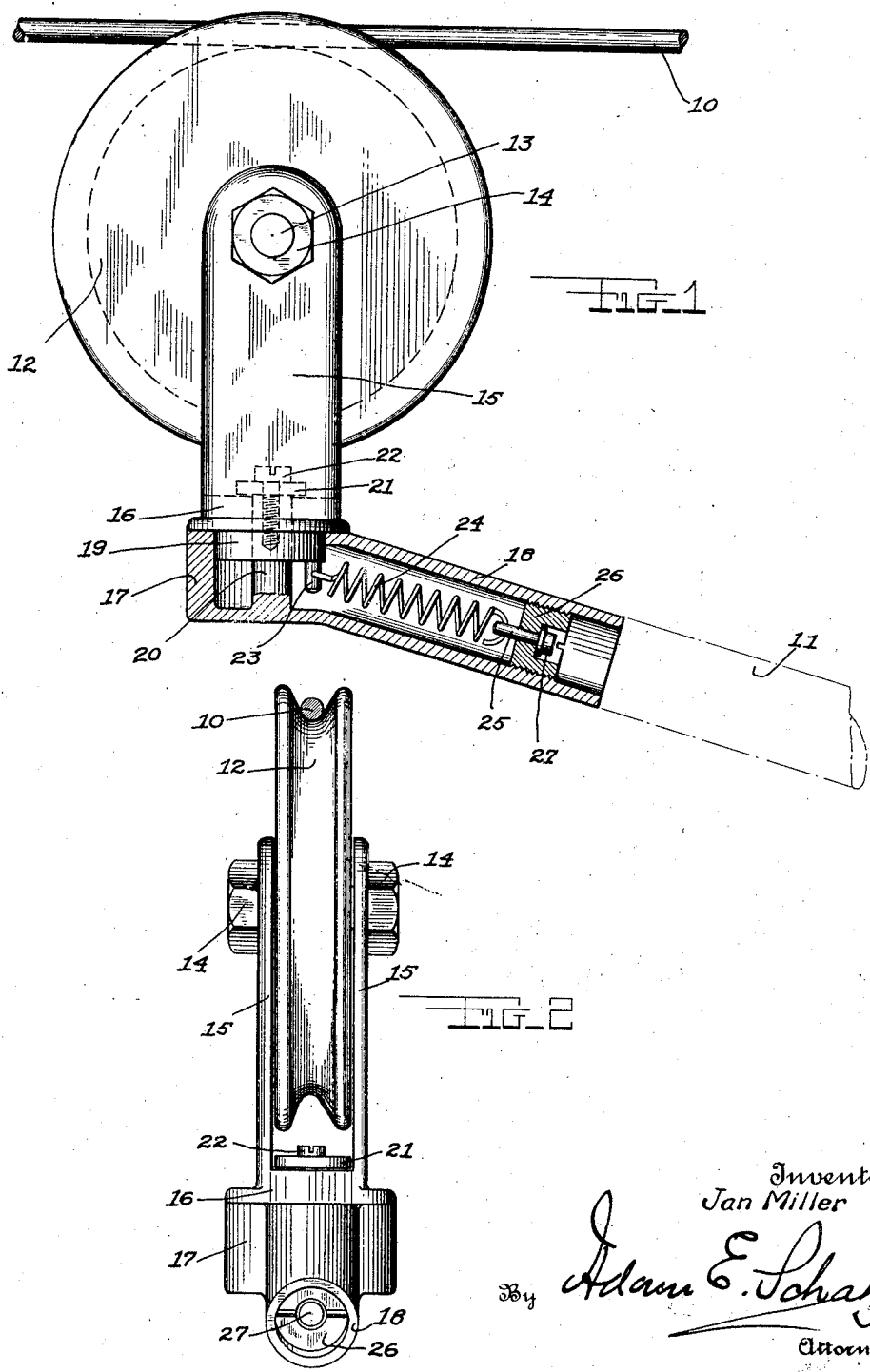

UNITED STATES PATENT OFFICE.

JAN MILLER, OF BROOKLYN, NEW YORK.

TROLLEY-HARP.

1,340,456.  Specification of Letters Patent.  Patented May 18, 1920.

Application filed July 23, 1919. Serial No. 312,655.

*To all whom it may concern:*

Be it known that I, JAN MILLER, a citizen of Poland, residing at Brooklyn, county of Kings, and State of New York, have invented certain new and useful Improvements in Trolley-Harps, of which the following is a specification.

This invention has for its object the provision of a trolley harp carrying a contact wheel in such manner as to yieldingly follow the course of the car to which the trolley pole is attached, preventing its displacement in following curves, thereby saving annoyance and delay.

This and other like objects are attained by the novel construction and combination of parts hereinafter described, and shown in the accompanying drawings, forming a material part of this disclosure, and in which—

Figure 1 is a side elevational view showing a trolley harp made in accordance with the invention, parts being broken away in order to disclose the interior construction, and Fig. 2 is a front elevational view of the same.

Referring to the drawings in detail, the numeral 10 represents a conventional type of line or feed wire, and 11 the trolley pole engaged with the car in such manner that the wheel 12 is normally held in contact with the feed wire.

This wheel is provided with the usual grooved face and rotates on an axle 13, held in position by nuts 14, after passing through the raised side elements 15 of the trolley harp, the same having a laterally flanged extended base 16, resting upon a similarly shaped head 17, with which is formed a tubular connection 18, engageable with the pole 11.

A round extension 19 is formed with the base 16, which rests in an opening suitably formed in the upper end of the head 17, with which is formed a central vertical pin 20, passing through an opening in the extension 19 and acting as a bearing upon which the harp may rotate limitedly, the same being held in engagement by a washer 21, secured by a screw 22, so as to prevent separation of the parts.

Fixed in the extension 19 near its periphery and centrally with respect to the side elements 15, is a pin 23, attached to which is one end of a helically coiled tension spring 24, the other end entering an opening formed in a stem 25, passing through a threaded sleeve 26, and formed with a head 27, seated in a recess formed in the sleeve, which is slotted so that it may be rotated, thereby adjusting the tension of the spring 24.

Obviously the action of the spring is to draw the pin 23 toward the lower end of the pole, and normally holding the trolley harp so that the groove of the wheel is in alinement with the pole, but which permits the wheel, together with the harp, to rotate on their supports to a limited extent, acting to prevent the feed wire 10 from becoming displaced from the wheel groove.

Having thus described my invention what I claim as new, and desire to secure by Letters Patent, is—

In a trolley harp, the combination with a pole, and a supporting means therewith, of a harp pivotally mounted on said support, a grooved wheel rotatably mounted in said support, said wheel being adapted to engage with a trolley wire, a stem extending from said support into said harp on which it is rotated, means for holding said harp on said stem, a cylindrical extension formed with said harp engaging in said support, a pin set in the periphery of said extension, a screw-threaded sleeve engaged in said support near its connection with the trolley pole, a stem adjustably mounted in said sleeve, and a spring engaging between said stem and said pin whereby said trolley wheel is normally held in alinement with the trolley pole.

In testimony whereof I have affixed my signature.

JAN MILLER.